(12) United States Patent
Tavernier et al.

(10) Patent No.: US 6,264,861 B1
(45) Date of Patent: *Jul. 24, 2001

(54) METHOD FOR PRODUCING ROUNDED POLYMERIC PARTICLES

(75) Inventors: Serge Tavernier, Lint; Daniel Heitzmann, Mortsel; Gerrit Delen, Herselt; Geert Tersago, Puurs, all of (BE)

(73) Assignee: Xeikon NV, Mortsel (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/337,736

(22) Filed: Jun. 22, 1999

Related U.S. Application Data

(60) Provisional application No. 60/095,480, filed on Aug. 5, 1998.

(51) Int. Cl.$^7$ ................................................. B29C 67/00
(52) U.S. Cl. ............................................. 264/15; 523/223
(58) Field of Search ................................. 264/15; 241/5, 241/22; 252/62.54; 427/222; 430/137; 523/223; 451/28, 36, 53

(56) References Cited

U.S. PATENT DOCUMENTS

| | | |
|---|---|---|
| 4,137,188 * | 1/1979 | Uetake et al. .......................... 264/15 |
| 4,345,015 | 8/1982 | Hendriksma et al. . |
| 4,900,647 * | 2/1990 | Hikake et al. .......................... 264/15 |
| 4,915,987 | 4/1990 | Nara et al. . |
| 4,948,692 | 8/1990 | Higashimura et al. ........... 430/106.6 |
| 4,994,340 | 2/1991 | Yamazaki et al. ................. 430/106.6 |
| 5,342,876 * | 8/1994 | Abe et al. .............................. 264/15 |

FOREIGN PATENT DOCUMENTS

3809662 A1    10/1988  (DE) .

OTHER PUBLICATIONS

Abstract for JP 6317933 A2: "Magnetic Toner and Electrophotographic Method", Issued: Nov. 15, 1994; Inventors: Yasuhito et al.

Abstract for JP 62100774 A2: "Heat Roll Fixing Type Magnetic Toner for Developing Magnetic Latent Image": Issued May 11, 1987; Inventors: Masumi et al.

European Search Report: Application No. EP 99 20 1950.

* cited by examiner

Primary Examiner—Jan H. Silbaugh
Assistant Examiner—Kenneth M. Jones
(74) Attorney, Agent, or Firm—Knobbe, Martens, Olson, and Bear LLP

(57) ABSTRACT

A method for rounding thermoplastic particles whereby the thermoplastic particles are stirred at a temperature around their plastification temperature, $T_{plast}$, together with particles that are larger than the thermoplastic particles and that have a higher specific gravity.

7 Claims, 1 Drawing Sheet

Quality D

Quality A

METHOD FOR PRODUCING ROUNDED POLYMERIC PARTICLES

This application claims benefit of provisional application No. 60/095,480 filed Aug. 5, 1998.

FIELD OF THE INVENTION

This invention relates a method for rounding and/or coating of polymeric particles. Especially but not exclusively to a method for rounding and/or coating of polymeric toner particles.

BACKGROUND OF THE INVENTION

In recent times an increased interest is found in powders, especially in applications aiming for the production of thin polyfunctional layers on substrates. Such applications can either aim for uniform layers, or can be aiming for the production of image-wise patterns. The specific technology used to realise such layers can be of different kinds, such as e.g. electrostatic powder spray coating, dipping, etc.. or more sophisticated technologies such as electrophotography for the creation of images starting from electroscopic powder particles, in such case commonly called dry toner particles. In all applications there is a need to go for smaller particles, in order to improve the coating in quality aspects such as smoothness, etc.. but also in order to reduce material cost. However one of the major problems encountered in going for smaller sizes in powders is the increase in specific surface of such powder, resulting in strong increase of cohesion and hence an increased tendency for agglomeration. This results in the presence of larger particles, being said agglomerates, during the coating process, thus jeopardising the benefits of using smaller particles. In most cases this will limit the use of smaller particles, and thus block any further progress of technology towards improved and less expensive thin layers. There is evidence that the actual detailed control of the shape of the particles might also be of relevance, so that not completely spherical particles are of interest, but somewhat potato-like structures.

There has been proposed a lot of methods to tackle said problems, in that spherical or semi-spherical particles are used to improve the resistance towards agglomeration. Another proposed solution to said problem is the design of core shell particles with specific low energy surface so that the cohesion and agglomeration forces are minimised. Although these proposals do indeed diminish the problem of agglomeration of the toner particles, the use of these concepts is strongly limited by the fact that there are only few and rather complex methods to make such rounded and/or surface-designed particles. Some methods for the production of said particles have been proposed. Depending on the method there is room for some control of the potato-shape or not.

In a first method, the particles are produced directly from suspension polymerisation. In some related proposed methods, the particles are produced from binder solutions, being dispersed in a non-compatible liquid, with subsequent evaporation of the solvent used in the dispersed droplets, in order to realise solid particles.

In still another proposed method the particles are prepared in situ by flocculation of pre-particles, e.g. latex particles, either using homo-, hetero, and or thermally assisted and/or flocculant assisted processes. In still another proposed method solid particles are dispersed and thermally heated above their plastification temperature, in most cases corresponding with the Tg of the particles, and upon stirring allowed to take a more spherical shape. Such a process has been described in U.S. Pat. No. 4,345,015 wherein it is disclosed to place irregularly shaped particles in a liquid carrier under stirring and heating them to a temperature at which the resin particles soften until they become spherical.

In all said cases the particles will during some time be present in a liquid, which has to be removed, discarded, the particles to be dried, hereby taking care not to have any drying residue on the surface, to avoid hydrophilicity on the particles, in case electrostatic processes are used in the subsequent application of the powder particles in the coating process, etc.. Also the use of energy to dry, the problems encountered to avoid agglomeration during drying etc. are to be overcome. These problems seriously reduce the usefulness of these approaches.

In a second method the particles are produced by using a hot gas stream. In a first proposed method the non spherical particles are continuously injected and fed in a heated gas stream. The temperature and residence time in the process is chosen in such a way that the particles are allowed to take a more spherical shape. Preferably the temperature is set at a temperature higher than the plastification temperature, i.e. Tg, of the polymers comprised in the particles to be rounded particles. The process can also be carried out as a batch process or as a continuous process. This is known in the art as fluidization. In still another approach a dispersion of the particles is made in a liquid and afterwards spray dried. In that particular case, the evaporation of the dispersant should take place and the amount of energy should be enough to plastisize the particles. In still another method the particles are dissolved and/or dissolved/partially dispersed in a liquid and spray dried in order to remove the solvent/dispersant. During the evaporation of the solvent the particles are dried and formed and spherical particles are formed. The drawback of all the above cited embodiments of the second method is that large amounts of hot gas are necessary and thus also a lot of energy because the spheroidization process can only take place above the plastification temperature. Another drawback is that this process has the tendency to form agglomerates and contamination of the wall of the equipment during the process. To avoid these drawbacks one has to work with small ratios of particles/gas resulting in small throughput of rounded particles and the use of large amounts of heated gas what makes this method from economical viewpoint problematic. Still another serious problem is the fact that a finely divided powder is made in a gas, which might give powder explosion in case oxygen is present. In order to reduce said risks, inert atmosphere is to be used which at such large volumes is extremely expensive. Still another drawback is that at the end the process the particles and heated gas have to be separated. This means special precautions to cool the gas and also actions have to be taken towards dust control in the final 'clean' gas stream, resulting again in a cost.

In a third method, as described in U.S. Pat. No. 4,915,987 the particles are shaped by bringing them in a mechanical mixing device wherein by applying mechanical energy and/or thermal energy the particles are rounded. The temperature control of this process is critical. Agglomeration of the particles and contamination of the inner walls of the equipment with plasticized material can easily take place. This necessitates an additional sieving step to get the original particle size. Said temperature control is difficult since the particles are in fluidised state, and this control also necessitates the use of complex and expensive cooling equipment. In order to avoid agglomeration, the particle concentration is kept low thus resulting in a low production speed, since in such devices a batch process is evident. This also rises the cost of particles produced by said method. Also the quality can be degraded by attrition due to the high mechanical impact of the rotor of the mixing device on the particles what means that an additional separation step can be necessary in order to get rid of the fines that are produced during the rounding process. So also in these methods drawbacks are present.

From the above cited methods we can learn that there is still a need for improvement for processes to round particles and for processes allowing for core-shell design on powder particles.

OBJECTS AND SUMMARY OF THE INVENTION

It is a first object of the invention to provide a simple and cost-effective method for rounding polymeric powder particles, especially dry toner particles for use in electrostatic printing or copying processes.

A second object of the invention is to provide a simple and cost-effective method for coating polymeric particles and simultaneously rounding them.

The first object of the invention is realised by providing a method for rounding thermoplastic particles, comprising the steps of:

mixing thermoplastic particles with an average volume diameter $d_{v50}$ and a $T_{plast}$ with 'non-thermoplastic' particles, the latter having a volume average particle size, $d2_{v50}$ such that $d2_{v50} \geq 1.5 \times d_{v50}$, and a specific gravity at least 1.5 times larger than that of said particles to be rounded, mechanically mixing said mixture for a period of at least 5 min at a temperature $T_{mix}$ such that $T_{plast}-15°$ C. $\leq T_{mix} < T_{plast}+30°$ C., rounding said thermoplastic particles, cooling said mixture and recovering said rounded thermoplastic particles from said mixture.

The second object of the invention is realised by providing a method for coating thermoplastic particles, comprising the steps of:

mixing thermoplastic particles having an average volume diameter $d_{v50}$ and a $T_{plast}$ with polymeric coating material and with 'non-thermoplastic' particles, the latter having a volume average particle size, $d2_{v50}$ such that $d2_{v50} \geq 1.5 \times d_{v50}$ and a specific gravity at least 1.5 times larger than that of said thermoplastic particles, mechanically mixing said mixture for a period of at least 5 min at a temperature $T_{mix}$ such that $T_{plast}-15°$ C. $\leq T_{mix} < T_{plast}+30°$ C., coating said thermoplastic particles, cooling said mixture and recovering said thermoplastic particles from said mixture.

DETAILED DESCRIPTION OF THE INVENTION

Figure 1:
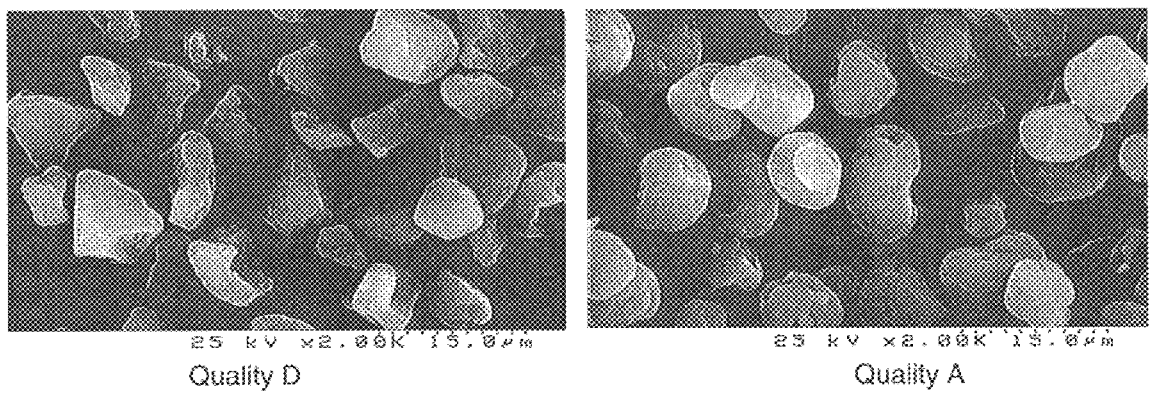
FIG. 1 shows a scanning electron microscope image of a toner with rounding quality D and one with rounding quality A.

The invention is concerned with rounding thermoplastic particles, especially dry toner particles, that have been prepared in manufacturing processes that give particles with very irregular shape and with a surface showing asperities, e.g. thermoplastic particles made by a melt-kneading process followed by crushing the cooled toner mass and classification of the particles. In FIG. 1, the photograph marked quality D shows such particles. It was now found that by a simple, fast and cost effective mechanical method such thermoplastic particles, particularly dry toner particles, could be rounded, i.e. after treatment the particles have a more or less round shape and show a surface with almost no asperities. In fact after the treatment by the method of the invention, the particles have a kind of potato-like shape with a rather smooth surface. In FIG. 1, the photograph marked quality A shows particles after treatment with the method of the invention.

The method according to this invention is basically a method whereby the thermoplastic particles are stirred at a temperature around the plastification temperature, $T_{plast}$, together with particles that are larger than the toner particles and that have a higher specific gravity.

The plastification behaviour of most thermoplastic materials can be described with a Tg-behaviour. In such a case the temperature, $T_{plast}$, will be Tg. The test used to determine Tg for simple materials is simple, such as DSC-(differential scanning calorimeter) methods etc..

For more complex materials or for mixtures of resins the $T_{plast}$ is to be defined by testing the deformability. In this document $T_{plast}$ of complex materials is determined by subjecting the material for 10 minutes to a load of 40 kg/cm² at various temperatures. The temperature at which a permanent deformation of 10% is found is taken as $T_{plast}$ in °C. Basically a $T_{plast}$ determined as described above for a single resin gives a temperature that is between 4 to 60° lower than the Tg.

The temperature of the rounding process can be set by separate heating and/or by the mixing process itself that can deliver enough heat in a start-up mode to heat the mixture by friction. In any case the temperature of is during mixing controlled so as to have $T_{plast}-15°$ C. $\leq T_{mix} < T_{plast}+30°$ C., preferably the temperature of the rounding process is controlled so that $T_{plast}-10°$ C. $\leq T_{mix} < T_{plast}+30°$ C. In a very preferred embodiment the temperature of the rounding process is controlled so that $T_{plast} \leq T_{mix} < T_{plast}+30°$ C. The upper limit of $T_{mix}$ depends at least partially of the scale on which the rounding, according to this invention, is performed. When rounding in a smaller scale, e.g., in mixers with a volume up to about 10 litre, there is no much need to use a $T_{mix}$ that is higher than $T_{plast}+10°$ C., when rounding in a medium scale, e.g., in mixers with a volume between 10 and about 50 liter, there is no much need to have a $T_{mix}$ that is higher than $T_{plast}+20°$ C., when rounding at higher scale, it can be beneficial to use a $T_{mix}$ that is close to $T_{plast}+30°$ C.

A preferred type of the so-called 'other' particles used for the methods disclosed above, is the use of 'non-thermoplastic' particles selected from the group consisting of cross-linked and/or highly filled resin particles and inorganic particles. Preferably inorganic particles or beads are used. Preferably use is made of smooth spherical particles. It is preferred to use 'non-thermoplastic' particles having a volume average particle size, $d2_{v50}$ such that $d2_{v50} \leq 1.5 \times d_{v50}$, more preferably $d2_{v50} \geq 2.5 \times d_{v50}$, even more preferably $d2_{v50} \geq 5 \times d_{v50}$. It is further advantageous that the particles have a specific gravity that is 1.5 times larger than that of the original particles to be treated, preferably 2 times larger, more preferably 4 times larger. It is also preferred that the 'non-thermoplastic' particles have good thermal conductivity thus allowing for homogeneous temperature equilibrium in the mixing device, therefore ferrite particles, magnetite and iron particles are preferred 'non-thermoplastic' particles used in this invention.

The particles to be rounded and the 'non-thermoplastic' particles are in the method of this invention mixed in a ratio of 3 parts by weight to 15 parts by weight of the particles to be rounded for 100 parts by weight of 'non-thermoplastic' particles.

The method for rounding dry polymeric particles, especially dry toner particles, according to this invention can also be used to simultaneously round the particles and apply a coating to them. In that case polymeric material with a composition different from the resin(s) already present in the polymeric particles is added to the polymeric particles and preferably mixed with them before the addition of the 'non-thermoplastic' particles used for the rounding. The polymeric material used to apply a coating on the polymeric particles can be in the form of a latex as well as in the form of polymeric beads. It is in this invention in any case preferred that the polymeric material for coating has an average particle size smaller than the average particle size of the polymeric particles, especially dry toner particles, to be coated. Preferably the average particle size of the polymeric material used for coating is at least 4 times smaller that the average particle size of the particles to be coated, preferably it is at least 10 times smaller. The polymeric material used for coating the particles can be addition polymers having acrylate and/or methacrylate units, styrene units, etc.. It can also be polycondensation polymers, e.g. polyesters, polyamides, etc. The method according to this invention can also be used to imbed inorganic particles or mixtures thereof in the surface of the thermoplastic particles, also mixtures of inorganic particles and polymeric coating material can be applied to the thermoplastic particles in the method of this invention.

The preferred concentration of the particles to be coated to the 'non-thermoplastic' particles is such that the surface coverage of the 'non-thermoplastic' particles is at most 200%, preferably at most 100%, even more preferably at most 50%, as can either be calculated and/or visually observed by microscopic techniques.

The method of this invention, both for rounding only as for simultaneous rounding and coating, can proceed in mechanical mixing devices either in so-called rotor-less mixers or in mixers with a rotor. This means that rotor-less mixers, e.g. a container, possibly containing some asperities or profiles thus allowing mechanical flow, and said container that can either be shaken, tumbled or rotated to induce mechanical movement, is useful in this invention. It is however preferred to use mixers containing rotors, e.g. mixers commercially available from Henschell, Lodige , etc.. The mixing such be such as not to deteriorate the particles, however allowing good flow. Preferred are HENSCHELL mixers, e.g. the types FM4, FM10 (trade names) etc. equipped with a cooling built in the wall, thus enabling good temperature control.

The mixer can be filled with material, in this case at least 10% by volume to be filled, at most 90%. Lower than 10% no impacting flow is realised, higher than 90% no good flow is realised. Preferably between the mixer is filled for 35% and 75% of its volume.

Cooling can be done easily. Either the mixture is allowed to cool under static condition, e.g. simply by cooling the mixer wherein the rounding proceeded or under dynamic conditions or is poured in a cold vessel and/or container.

After the rounding step the particles that have been treated must be separated from the 'non-thermoplastic' particles. This can be done by any separating device known in the art, such as classical sieves, cyclones, fluidised bed separators, up to expensive classifier such as static NPK-air classifiers and dynamic air classifiers. The cost-effectiveness of the method is enhanced when care is taken to reduce too strong mechanical impact on the non-thermoplastic beads, in order to be able to re-use them afterwards. When the particles that have been treated are magnetic toner particles that have been treated with non magnetic 'non-thermoplastic' particles, it is possible to separate the particles by magnetic forces. The same separation technique can be used when non-magnetic toner particles have been treated with magnetic 'non-thermoplastic' particles, e.g. iron or ferrite particles.

EXAMPLES

Preparation of Toner 1 (T1)

49 parts of a polyester of fumaric acid and di-propoxylated Bisphenol A (ATLAC T500 is a registered trade name of Atlas Chemical Industries Inc. Wilmington, Del. U.S.A.).and 49 parts of a polyester derived from terephthalic acid (40 mol %), isophthalic acid (60 mol %) as aromatic di-acids and a mixture of di-ethoxylated Bisphenol-A (40 mol %) and ethylene glycol (60 mol %) were melt-blended for 30 minutes at 110° C. in a laboratory kneader with 2 parts of Cu-phthalocyanine pigment (Colour Index PB 15:3).

After cooling the solidified mass was pulverised and milled using an ALPINE Fliessbettgegenstrahlmühle type 100AFG (trade name) and further classified using an ALPINE multiplex zig-zag classifier type 100MZR (trade name). The average particle diameter of the separated toner was measured by Coulter Counter model Multisizer (trade name) and was found to be 8.3 µm by volume. The specific gravity was 1.25 g/cm$^3$ (1250 Kg/m$^3$).

$T_{plast}$ was determined by subjecting the toner for 10 minutes to load of 40 kg/cm$^2$ at various temperatures. The temperature at which a permanent deformation of 10% was found, was taken as $T_{plast}$ and was 53° C.

Preparation of Toner 2 (T2)

34 parts of a polyester of fumaric acid and di-propoxylated Bisphenol A (ATLAC T500 is a registered trade name of Atlas Chemical Industries Inc. Wilmington, Del. U.S.A.) and 34 parts of a polyester derived from terephthalic acid (40 mol %), isophthalic acid (60 mol %) as aromatic di-acids and a mixture of di-ethoxylated Bisphenol-A (40 mol %) and ethylene glycol (60 mol %) were melt-blended for 30 minutes at 110° C. in a laboratory kneader with 2 parts of Cu-phthalocyanine pigment (Colour Index PB 15:3) and 30 parts by weight of hydrophobic $SiO_2$ particles (AEROSIL R 972) trade name of Degussa AG, Germany).

After cooling the solidified mass was pulverised and milled using an ALPINE Fliessbettgegenstrahlmühle type 100AFG (trade name) and further classified using an ALPINE multiplex zig-zag classifier type 100MZR (trade name). The average particle diameter of the separated toner was measured by Coulter Counter model Multisizer (trade name) and was found to be 12 µm by volume. The specific gravity was 1.45 g/cm$^3$ (1450 Kg/m$^3$).

$T_{plast}$ was determined by subjecting the toner for 10 minutes to load of 40 kg/cm$^2$ at various temperatures. The temperature at which a permanent deformation of 10% was found, was taken as $T_{plast}$ and was 57° C.

Preparation of Toner 3 (T3)

98 parts of a polyester with Tg 63 incorporating terephthalic acid and isophthalic acid moieties and a mixture of di-ethoxylated Bisphenol-A and ethylene glycol were melt-blended for 30 minutes at 110° C. in a laboratory kneader with 2 parts of Cu-phthalocyanine pigment (Colour Index PB 15:3).

After cooling the solidified mass was pulverised and milled using an ALPINE Fliessbettgegenstrahlmühle type 100AFG (trade name) and further classified using an ALPINE multiplex zig-zag classifier type 100MZR (trade name). The average particle diameter of the separated toner was measured by Coulter Counter model Multisizer (trade name) and was found to be 8.2 μm by volume. The specific gravity was 1.2 g/cm³ (1,200 Kg/m³).

Since this is a single resin toner, Tg of the resin was taken as $T_{plast}$, it was 63° C.

ROUNDING EXAMPLES

Rounding Example 1 (RE1)

10 parts by weight of toner particles T1 were mixed with 100 parts of silicagel particles as 'non-thermoplastic' particles. The silicagel particles had an average particle diameter of 49 μm and a specific gravity of 2,200 Kg/m³. This mixture was charged in a HENSCELL mixer FM4 (trade name) with a mixing chamber of 4 litre, resulting in a filling degree of 60% by volume. The mixer was operated at 500 rpm (rotations per minute). The mixture was brought to 50° C. in 5 minutes time and kept at that temperature for an other 15 minutes. Three samples of the mixture were taken, one after 5 minutes, 10 minutes and 15 minutes of mixing.

After cooling, the toner particles and the 'non-thermoplastic' particles, present in the four samples, were separated over an air classifier. The treated toner particles separated from the three samples were observed in Scanning Electron Microscopy (SEM). The shape was observed to be rounded. The degree of rounding was compared with the original form of the particles on a scale ranging from D (the form of the original particles) over C and B to A (almost perfect rounding), in FIGURE 1 the shape of toner particles with quality D and of toner particles with quality A are shown. The results are summarised in table 1. A value C+ for rounding means that the rounding is better than C, but not as good as B, the same applies, mutatis mutandis, for B+.

Rounding Example 2 (RE2)

Rounding example 1 was repeated except that the silicagel-particles were exchanged for ferrite particles with average particle size of 50 μm and a specific gravity of 5000 Kg/m³. 5 parts by weight of toner particles were mixed with 100 parts by weight of ferrite particles. The results are summarised in table 1.

Rounding Example 3 (RE3)

Rounding example 1 was repeated except that iron particles with average particle size of 45 μm were used and a specific gravity of 7500 Kg/m³. 4 parts by weight of toner particles were mixed with 100 parts by weight of iron particles. The results are summarised in table 1.

Rounding Example 4 (RE4)

Rounding example 3 was repeated with toner particles T3, having a $T_{plast}$ taken from the Tg of the toner resin of 63° C. The results are summarised in table 1.

Rounding Example 5 (RE5)

Rounding example 4 was repeated but at a mixing temperature of 62° C. The results are summarised in table 1.

Rounding Example 6 (RE6)

Rounding example 3 was repeated but with a toner T2. The rounding was performed at 65° C. The results are summarised in table 1.

Rounding example 7 (RE7)

Rounding example 3 was repeated except that iron particles were used with a average particle size of 21 μm and a specific gravity of 7500 Kg/m³. 6.75 parts by weight of toner particles were mixed with 100 parts by weight of iron particles. The results are summarised in table 1.

Rounding Example 8

Rounding example 2 was repeated but at a ten times larger scale and at 60° C. The results are summarised in table 1.

TABLE 1

| # | $d2_{v50}/D_{v50}$ | $sg_{nt}/sg_t$ | $T_{plast}$ | $T_{mix}$ | 5 min | 10 min | 15 min |
|---|---|---|---|---|---|---|---|
| RE1 | 5.90 | 1.76 | 53 | 50 | C | C | C+ |
| RE2 | 6.02 | 4.00 | 53 | 50 | C+ | B | B+ |
| RE3 | 5.42 | 6.00 | 53 | 50 | C+ | B+ | A |
| RE4 | 5.49 | 6.25 | 63 | 50 | D+ | C | C |
| RE5 | 5.49 | 6.254 | 63 | 62 | B+ | B+ | A |
| RE6 | 3.75 | 5.36 | 57 | 65 | C+ | B | B+ |
| RE7 | 2.53 | 6.00 | 53 | 50 | C | C+ | C+ |
| RE8 | 6.02 | 4.00 | 53 | 60 | C+ | B | B+ |

$d2_{v50}/d_{v50}$: ratio of the average volume diameter of the non-thermoplastic particles to the average volume diameter of the toner particles
$sg_{nt}/sg_t$: ratio of the specific gravity of the non-thermoplastic particles to the specific gravity of the toner particles $d2_{50}/d_{v50}$: ratio of the average volume diameter of the non-thermoplastic particles to the average volume diameter of the toner particles sgnt/sgt: ratio of the specific gravity of the non-thermoplastic particles to the specific gravity of the toner particles

Example 9: Rounding and Coating 5 parts by weight of toner particles T1 and 0.15 parts by weight of a dried and crushed polymethylmethacrylate latex with diameter of 0.15 μm were mixed together. Then this mixture was added to 100 parts by weight of ferrite particles with average particle size of 45 μm and a specific gravity of 5000 Kg/m³. This mixture was charged in a HENSCHELL mixer (FM4, trade name) with a volume of the mixing chamber of 4 liter, resulting in a filling degree of 60% by volume. The mixer was operated at 500 rpm (rotation per minute). The mixture was brought to 50° C. in 5 minutes time and kept at that temperature for an other 15 minutes. After 15 minutes, the resulting toner particles are both rounded (rounding quality B) and showed a clear hard shell of polymeric methylmethacrylate on the surface.

Example 10: Rounding and Coating

Example 9 was repeated with the same toner composition, but instead of the polymethylmethacrylate latex, 0.6 parts by weight of polymeric microbeads with average particle size of 0.4 μm, consisting of co-poly(methylmethacrylate/ dimethylaminoethylacrylate) (Tg=110° C.). Even after 5 minutes of rounding a moderate roundness was observed (level C+) and a good embedding and filming of the fine particles onto the toner surface.

What is claimed is:

1. A method for rounding thermoplastic particles, comprising the steps of:

mixing thermoplastic particles with an average volume diameter $d_{v50}$ and a $T_{plast}$ with 'non-thermoplastic' particles, the latter having a volume average particle size, $d2_{v50}$ such that $d2_{v50} \geq 1.5 \times d_{v50}$, and a specific gravity at least 1.5 times larger than that of said particles to be rounded, mechanically mixing said mixture for a period of at least 5 min at a temperature $T_{mix}$ such that $T_{plast}-15°$ C.$\leq T_{mix} < T_{plast}+30°$ C., rounding said thermoplastic particles, cooling said mixture and recovering said rounded thermoplastic particles from said mixture.

2. A method according to claim 1, wherein $T_{mix}$ is chosen such that $T_{plast}-10°$ C.$\leq T_{mix} < T_{plast}+30°$ C.

3. A method according to claim 1, wherein $T_{mix}$ is chosen such that $T_{plast} \leq T_{mix} < T_{plast}+30°$ C.

4. A method according to claim 1, wherein said 'non-thermoplastic' particles are selected from the group consisting of cross-linked resin particles, highly filled resin particles and inorganic particles.

5. A method according to claim 4, wherein said 'non-thermoplastic' particles are selected from the group consisting of ferrite particles, magnetite particles and iron particles.

6. A method according to claim 1, wherein said 'non-thermoplastic' particles have an average volume diameter, $d2_{v50}$ such that $d2_{v50} \geq 2.5 \times d_{v50}$.

7. A method according to claim 1, wherein said 'non-thermoplastic' particles have a specific gravity that is at least 4 times larger than that of said thermoplastic particles.

* * * * *